United States Patent [19]

Giles, Jr.

[11] Patent Number: 5,260,017
[45] Date of Patent: Nov. 9, 1993

[54] METHOD FOR IMPROVED SURFACE PROFILE OF COMPOSITE STRUCTURES

[75] Inventor: Harold F. Giles, Jr., Cheshire, Mass.

[73] Assignee: General Electric Company, Pittsfield, Mass.

[21] Appl. No.: 20,873

[22] Filed: Feb. 19, 1993

Related U.S. Application Data

[63] Continuation of Ser. No. 861,354, Mar. 30, 1992, abandoned, which is a continuation of Ser. No. 459,871, Jan. 2, 1990, abandoned.

[51] Int. Cl.$^5$ ............... B29C 43/20; B29C 43/52
[52] U.S. Cl. .................... 264/322; 264/257; 264/325; 264/DIG. 65; 264/122; 264/126; 425/394; 425/411; 425/DIG. 39
[58] Field of Search ............. 264/257, 258, 319, 322, 264/325, 122, DIG. 65, 126; 425/394, 397, 411, DIG. 39; 428/236, 251, 286

[56] References Cited

U.S. PATENT DOCUMENTS

| | | | |
|---|---|---|---|
| 3,620,892 | 11/1971 | Wincklhofer et al. | 264/322 |
| 3,716,449 | 2/1973 | Gatward et al. | 162/101 |
| 3,850,723 | 11/1974 | Ackley | 264/322 |
| 4,230,656 | 10/1980 | Amin et al. | 264/322 |
| 4,304,751 | 12/1981 | Li et al. | 425/193 |
| 4,390,489 | 6/1983 | Segal | 264/316 |
| 4,716,072 | 12/1987 | Kim | 428/212 |
| 4,859,524 | 8/1989 | Kim et al. | 428/236 |
| 4,970,044 | 11/1990 | Kim et al. | 264/266 |

FOREIGN PATENT DOCUMENTS

| | | |
|---|---|---|
| 335097 | 10/1989 | European Pat. Off. . |
| 335098 | 10/1989 | European Pat. Off. . |
| 62-231715 | 10/1987 | Japan ................ 264/85 |

OTHER PUBLICATIONS

Chou et al., Scientific American, vol. 255, No. 4, Oct. 1986, pp. 192-203—Composites.
Krone et al., Plastics Technology, Nov. 1986, pp. 61-65—Thermostamping of Composite Sheets.
Smooth Thermoplastic Moldings, Inside R&D, Nov. 1, 1989, pp. 7 and 8.

*Primary Examiner*—Jeffery Thurlow
*Assistant Examiner*—Mathieu Vargot

[57] ABSTRACT

A method for making improved surface profile composite structures containing crystalline thermoplastic materials involves employing individual glass filaments and molding with a hot mold insert. The method provides composites having smooth surfaces suitable for automotive applications.

8 Claims, No Drawings

METHOD FOR IMPROVED SURFACE PROFILE OF COMPOSITE STRUCTURES

This is a continuation of application Ser. No. 07/861,354 filed on Mar. 30, 1992 now abandoned, which is a continuation of Ser. No. 07/459,871 filed on Jan. 2, 1990, now abandoned.

BACKGROUND OF THE INVENTION

1. Field of the Invention

The present invention relates to a method for making composite structures, and more particularly relates to a method for making smooth surface profile composite structures.

2. Description of Related Art

A glass fiber reinforced composite product must demonstrate appropriate mechanical properties such as tensile, flexural and impact strength and possess a smooth, defect free surface on at least one side to replace parts formed from sheet metal panels. The suitability of using reinforced thermoplastic resin composites for vehicle body parts is currently being investigated. The sheet metal currently used for wide, thin body parts, such as the hood or trunk of an automobile, is a likely candidate for replacement by a glass fiber reinforced composite material.

Generally, such a glass fiber reinforced composite body part would be manufactured by providing layers of thermoplastic resin fiber mat in the desired quantity and structural arrangement to form a laminated structure; by heating the laminate to a temperature in the range of about 200° C. to about 375° C., depending on the thermoplastic resin system, and by applying a pressure to the laminate in the range of about 5 lb/in$^2$ to about 80 lb/in$^2$, thereby forming a composite material blank and by shaping the composite blank by flow forming or compression molding processes to form the desired vehicle body part. While a composite material manufactured by such a process possesses the mechanical and flexural strength required of a vehicle body part, the high quality, smooth defect-free surface finish that is also required to meet automotive requirements for exterior body applications has been difficult to produce by the use of existing composite structures and processing techniques. A general discussion of existing processes for producing and for compression molding composites may be found in "Composites", Chou, T., et. al., Scientific American, Vol. 255, No. 4, October 1986, pp. 192–203, and Krone, J. R., and Walker, J. H., "Processing Thermoplastic Advanced Composites", Plastics Technology, Vol. 32, No. 11, November 1986, pp. 61–5.

In a typical flow forming process the composite blank is heated in a conventional oven by convection or infrared radiation to a temperature in the range of about 200° C. to about 375° C., depending on the thermoplastic resin. During the initial heating in the oven the fibers expand, resulting in a resin poor coating of the composite surface. In addition, this expansion of the fibers results in a lofting, or movement, of the fibers into the resin surface layers.

Following the oven heating, the composite is transferred to the mold where it is shaped by applying pressure in the range of about 1000 lb/in$^2$ to about 5000 lb/in$^2$ with mold surfaces whose temperatures range from about 55° C. to 150° C. During the transfer of the composite from the oven to the mold the composite surface cools and the surface resins "freeze" into position with a glass rich rough surface. This "freezing" of the resin at the surface prevents the resin from flowing readily during the molding process and, consequently, rough boundaries are produced between the newly formed surface areas and the original surface areas. In addition, the resulting composite surface is only partially filled with resins, even though some hot resin will move from the composite core to the surface during the molding process. This partially filled resin surface, particularly around and near the lofted fibers, is a major cause of surface roughness.

This problem of surface roughness is particularly troublesome for composites of crystalline thermoplastic resins because crystalline thermoplastic resins exhibit substantial shrinkage during cooling thereby projecting fibers at the surface of the composite.

It is an object of the present invention to provide a method for reducing the surface roughness of composites containing crystalline thermoplastic resin.

SUMMARY OF THE INVENTION

The present invention involves a method for producing smooth surfaced crystalline thermoplastic resin composite articles. The method involves employing individual fibers rather than fiber bundles or fiber mats and using a hot mold insert.

DETAILED DESCRIPTION OF THE INVENTION

The method of the present invention involves the steps of (i) making a web of individual reinforcing fibers randomly dispersed in a crystalline thermoplastic material; (ii) creating a reinforced thermoplastic composite sheet by (a) compressing the web under pressure and at a temperature above the melt temperature of the crystalline thermoplastic material and then (b) cooling the web to a temperature beneath the melt temperature of the thermoplastic material; and (iii) compression molding said composite sheet between two mold halves, said mold halves being at a temperature beneath the heat distortion temperature of said thermoplastic material, the method further comprising having a mold insert located between the sheet and the adjacent mold half during compression molding, the mold insert having a temperature above the melt temperature of the thermoplastic resin.

The combination of using individual fibers and a heated mold insert in the method of the present invention provides composite sheets having improved surface characteristics over (i) composites made using a hot mold insert plate and employing fiber mats or fiber bundles and (ii) composites made from individual fibers when no heated insert is employed.

Suitable thermoplastics for use in the present invention include crystalline thermoplastic resins. Crystalline resins have distinct melting points and are generally opaque. Crystalline resins include crystalline polyamides such as nylon 6, crystalline polyesters such as polybutylene terephthalate which is derived from butylene glycol and terephthalic acid, blends of bisphenol A polycarbonate and polybutylene terephthalate, and crystalline compositions obtained from admixing nylon 6, polyphenylene ether and a dicarboxylic acid such as citric acid. Many other crystalline resins are well known.

The reinforcing fibers employed are individual single fibers and are preferably selected from the group consisting of glass, carbon, ceramic and aramid fibers. The fibers preferably have lengths selected from between 250 mils and 750 mils, and have diameters selected from between 5 microns and 30 microns. Fiber bundles and fiber mats are unsuitable for the process of the present invention. The preferred fibers are glass filaments.

The webs of reinforcing fibers and crystalline thermoplastic powder are preferably obtained by a water and surfactant dispersion process. A suitable process for producing the web is set forth in Gatward, et. al., U.S. Pat. No. 3,716,449, which is incorporated herein by reference. The non-woven fibrous webs of plastic particulates and reinforcing fibers are made from an aqueous foamed dispersion of water, surfactant, plastic powder and reinforcing fibers, mixing the dispersion and draining the liquid from the dispersion to form the web.

The composite sheet, also called composite blank, is produced by consolidating the web under pressure at temperatures above the melt temperature of the thermoplastic resin.

The composite article, also called a composite structure, is then produced by preheating the composite sheet to a temperature above the melt temperature of the resin and then compression molding the preheated sheet between two mold halves having temperatures below the heat distortion temperature of the thermoplastic resin, preferably the mold halves are at temperatures between 100° F. and 200° F. The smooth surface is obtained by placing a heated mold insert between a surface of the sheet and the adjacent mold half immediately prior to compression molding. The mold insert during compression molding is initially at a temperature above the melt temperature of the thermoplastic material. The mold insert is a thin metal insert, for example 40 mils to 250 mils, more preferably 60 mils to 125 mils, most preferably 100 mils thick, having a smooth Class A finish and being in the shape of the final part. The insert is heated by an exterior source to 400° F. to 700° F., preferably 500° F. to 600° F., depending on the material to be molded. The hot mold insert is placed in the mold with a preheated composite blank, and pressed in the mold. The mold halves act as heat sinks to remove the heat from the composite and the metal insert simultaneously. When the composite has cooled sufficiently, below the glass transition temperature of the resin, the insert and resulting composite article are removed and the insert is heated for the next cycle. Composite articles made using the method of the present invention duplicate the quality of the hot mold insert surface reducing porosity, blank boundaries, glass prominence, and fiber ends on the surface.

The use of hot mold inserts has been done prior to applicant's invention, however, when fiber bundles or fiber mat composites were employed problems of glass prominence were experienced at the composite surface. Applicant has discovered that with the uniform fine dispersion of glass filaments and resins in the consolidated sheets obtained from webs made by water/surfactant dispersion processes, excellent surface profiles have been demonstrated with crystalline resins using the hot plate molding technique. The use of composites having dispersed individual fibers significantly reduces the surface profile problems associated with fiber bundles so that during cooling of the composite in the thermostamping process, the crystallization of the crystallizing resin results in shrinkage occurring around 10 to 15 micron diameter filaments instead of 150 to 200 micron bundles, thereby reducing glass prominence at the surface resulting in superior surface smoothness.

The composites may also include an outer cap layer of thermoplastic resin containing no fiber so as to further improve the surface smoothness of the compression molded composite article.

EXAMPLES

The following examples illustrate the present invention but are not meant to limit the scope thereof.

Composites of examples 1-12 were obtained using a plastic powder of a blend of 65 weight parts nylon 6, 35 weight parts polyphenylene ether, 5 weight parts high impact polystyrene and 1 part by weight citric acid. The glass fibers used were individual glass fibers rather than bundles or mats. Webs were prepared from the plastic powder and glass fibers using water/surfactant dispersion process. The webs were then consolidated under heat and pressure to create sheets. Some of the sheets were then capped with outer cap layers. Sheets were preheated to 500° F. The sheets were then compression molded using a hot mold insert plate preheated to 550° F., which is above the melt temperature of the plastic used. The mold halves were maintained at 100° F.

Example 1 was a sheet consolidated from a web of 30% by weight glass and 70% by weight plastic and was capped on both sides with two film of 10 mils each of 65/35/5/1 blend of nylon 6/polyphenylene ether/high impact polystyrene/citric acid. The sheets of examples 2 and 3 were the same structure as example 1. The sheet of example 4 was the same structure as example 3 but did not have the cap layers.

Examples 5 to 8 were sheets consolidated from webs containing 35% by weight glass and 65% by weight resin. The sheets of examples 5 to 7 were capped with two layers of 10 mil film on each side. The sheet of example 8 was not capped. The film and plastic powder used were the same as in example 1.

Examples 9 to 12 were sheets consolidated from webs containing 40% by weight glass and 60% by weight resin. Examples 9 to 11 were capped with two layers of film on each side. The resin and film employed in examples 9 to 12 were the same as in example 1.

Comparative example A was made from 70% by weight of the resin blend and 30% by weight of a fine glass fiber mat and was molded using a hot mold plate insert.

Webs were consolidated at 580° F. under pressures of 30 pounds per square inch. Caps were laminated onto the sheets at 580° F. and 30 pounds per square inch. Note that the surfaces of examples 1 to 12 were substantially smoother than comparative example A.

TABLE 1

| Example | Roughness in Microinches |
| --- | --- |
| A | 29.4 |
| 1 | 9.8 |
| 2 | 9.8 |
| 3 | 9.0 |
| 4 | 8.4 |
| 5 | 9.0 |
| 6 | 9.2 |
| 7 | 10.8 |
| 8 | 14.8 |
| 9 | 10.0 |
| 10 | 8.4 |
| 11 | 14.0 |
| 12 | 15.0 |

The roughness is the arithmetical mean deviation of the roughness profile and is the arithmetical mean of the absolute distances from the arithmetical mean line to the roughness profile within the evaluation length. A hot steel mold insert plate was employed during thermostamping. The hot mold insert plate was heated to 550° F. The mold halves were at 100° F. During the molding process the sheet is preheated to 550° F., the hot insert plate is placed on a surface of the sheet, the sheet and plate are placed in the mold, and the mold halves are closed to thermostamp the sheet.

Examples 13 to 17 involve glass fiber reinforced thermoplastic resin blends of 65/35 weight % polybutylene terephthalate/bisphenol A polycarbonate. Examples 13 to 15 used a composite containing 30% by weight of fine glass fiber mats and 70% by weight thermoplastic resin. Examples 16 and 17 used a composite containing 30% by weight of a coarse fiber mat and 70% by weight thermoplastic resin. Examples 14 to 17 were made using a hot plate insert having a temperature of between 500° F. to 600° F. During the molding process the sheet is preheated to 500° F., the hot insert plate is placed on a surface of the sheet, the sheet and plate are placed in the mold, and the mold halves are closed to thermoform the sheet. Examples 15 and 17 were capped with 10 mils PBT/PC film.

Examples 18 to 20 involved a composite of 30% by weight fine glass fibers and 70% by weight 65/35 PBT/PC resin obtained using a water/surfactant dispersion process of plastic powder and individual glass fiber filaments having lengths of about ½ inch. Example 18 was not capped. Example 19 was capped during consolidation. Example 20 was capped during compression molding. Examples 18 to 20 were molded using a hot mold insert plate.

TABLE 2

| Example | Roughness in Microinches | Capped with Film |
| --- | --- | --- |
| 13 | 33.6 | No |
| 14 | 20.2 | No |
| 15 | 16.6 | Yes |
| 16 | 50.0 | No |
| 17 | 35.0 | Yes |
| 18 | 9.2 | No |
| 19 | 8.0 | Yes |
| 20 | 7.2 | Yes |

Note that example 18 using randomly dispersed individual fibers and a hot mold insert plate had a surface roughness of only 9.2 compared to the composites made with the course mats and the fine fiber mats. If the end article is to be painted, then the composite made should be a capped composite to minimize paint solvents wicking into the composite along a fiber and during painting and volatilizing in the paint bake cycle to create a blister under the painted surface.

What is claimed:

1. A method for making smooth surfaced fiber reinforced crystalline thermoplastic composite articles comprising the steps of:
   (a) producing a web consisting essentially of randomly dispersed individual glass fibers in a crystalline resin powder matrix;
   (b) consolidating said web at temperatures above the melt temperature of said resin into a reinforced thermoplastic composite; and
   (c) stamping said composite, said stamping comprising the steps of:
      (i) heating said composite to a temperature above the melt temperature of said resin;
      (ii) placing a pre-heated mold insert plate adjacent a surface of said pre-heated composite, said plate being at a temperature above the melt temperature of said resin;
      (iii) compressing said pre-heated composite and plate at a temperature above the melt temperature of said resin between two mold halves, said mold halves being at temperatures below the heat distortion temperature of said resin; and
      (iv) removing the heat from the composite and the mold insert plate.

2. The method of claim 1 wherein said pre-heated plate is at a temperature of between 500° F. and 600° F. when placed adjacent said composite surface.

3. The method of claim 2 wherein said resin is a blend of polybutylene terephthalate and bisphenol A polycarbonate.

4. The method of claim 2 wherein said plate is steel.

5. The method of claim 4 wherein said plate has a thickness of about 100 mils.

6. The method of claim 1 wherein the diameters of said fibers are between 5 microns and 30 microns and the lengths of said fibers are between 0.25 inches and 0.75 inches.

7. The method of claim 1 wherein said fibers have diameters selected from between 10 microns and 15 microns.

8. The method of claim 1 wherein said fibers are present at a level of from 30% by weight to 40% by weight based on the total weight of resin and glass fibers in said composite.

* * * * *